United States Patent Office 3,418,231
Patented Dec. 24, 1968

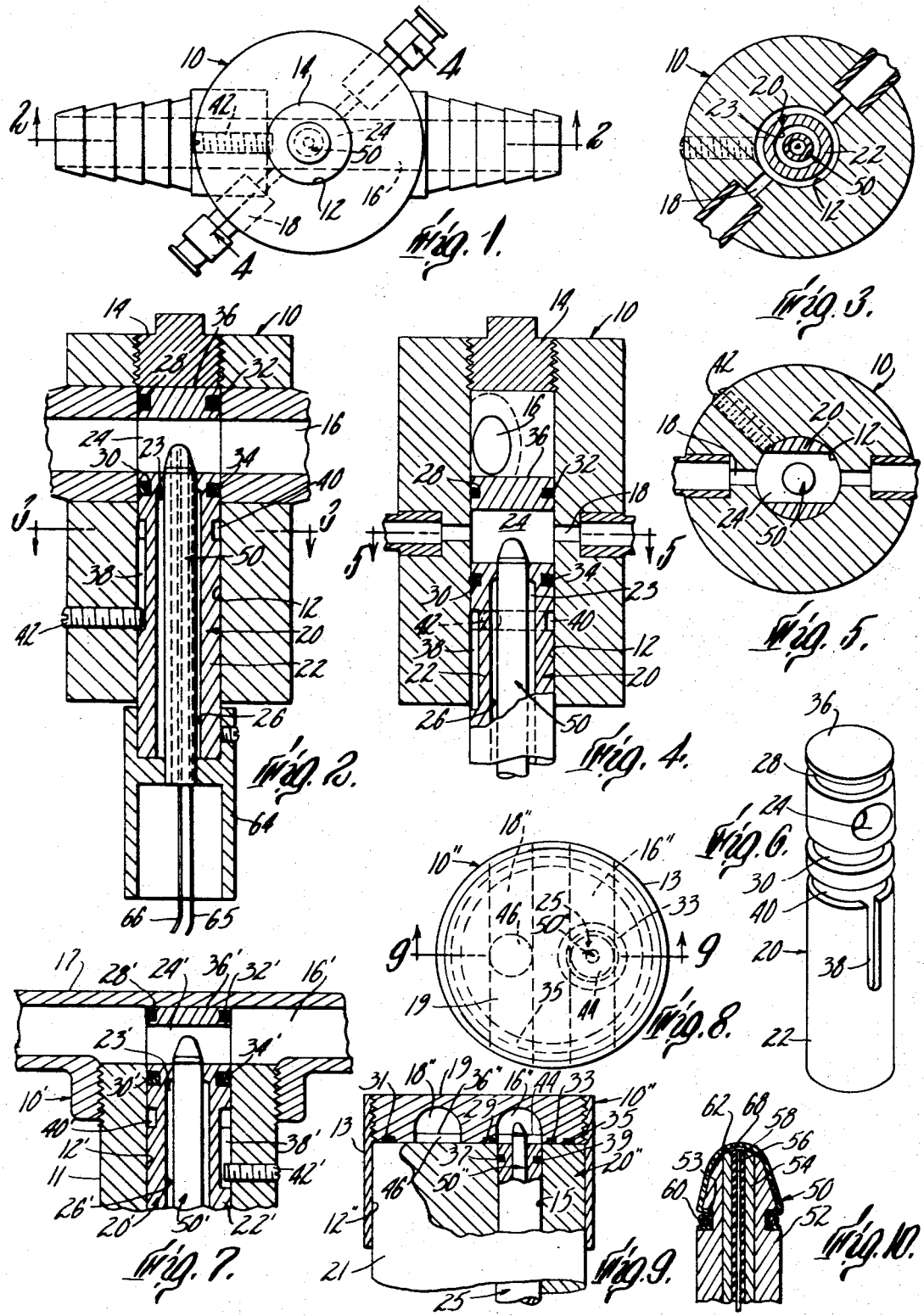

3,418,231
CUVETTE FOR SUPPORTING A SENSING CELL
Ihsan A. Haddad, Brighton, Mass., assignor to Instrumentation Laboratory, Inc., a corporation of Massachusetts
Filed Nov. 9, 1965, Ser. No. 506,971
16 Claims. (Cl. 204—195)

This invention relates to apparatus for making measurements in a flowing stream and more particularly to sensitive electrode apparatus for selectively making measurements in a flowing stream and calibrations of the sensitive electrode outside said stream.

It is a prime object of this invention to provide a cuvette supporting a sensing element to make measurements in a continuously flowing stream and alternatively to calibrate the sensing element, which may be highly sensitive to pressure and temperature variations, outside the stream, yet within the cuvette and without significantly disturbing or blocking the stream, particularly where such disturbance must be avoided, e.g., when the cuvette is in series with the blood supply of a patient. Another object of this invention is to provide a cuvette in which the sensing element may be moved from a measuring to a calibrating position and may function without any handling of the element itself. Yet another object of this invention is to provide a cuvette from which the sensing element may be completely removed for repairs, electrolyte replacement, membrane replacement and the like, without interference with the flowing stream. Further objects of this invention are to provide apparatus which avoids significant volumetric changes in the flowing stream when the sensing element is removed therefrom and which seals the flowing stream from contaminants at all times.

In general, this invention features a housing having a pair of spaced-apart chambers therein adapted for connection to sources of fluid for respective measurement and calibration. A sensing element carrier is provided in said housing movable therein between said chambers to openings in the walls thereof whereby a suitable sensing element may be selectively placed in either of said measurement or calibration chambers. A movable sealing wall is also provided on said carrier movable therewith to seal the measurement chamber when the carrier is moved to the calibration chamber.

Other objects, features and advantages of this invention will be apparent to those skilled in the art from the following detailed description thereof together with the accompanying drawings in which:

FIG. 1 is a plan view of a preferred embodiment of the invention;

FIG. 2 is a sectional elevation along the line 2—2 of FIG. 1;

FIG. 3 is a sectional plan view along the line 3—3 of FIG. 2;

FIG. 4 is a sectional elevation along the line 4—4 of FIG. 1;

FIG. 5 is a sectional plan view along the line 5—5 of FIG. 4;

FIG. 6 is an isometric view of an element of the invention utilized in the preferred embodiment thereof illustrated in FIGS. 1–5;

FIG. 7 is a sectional elevation of alternate preferred embodiment of this invention;

FIG. 8 is a plan view of yet another embodiment of this invention;

FIG. 9 is a sectional elevation along the line 9—9 of FIG. 8; and

FIG. 10 is an enlarged fragmentary sectional elevation of a preferred electrode assembly utilized in this invention.

With reference to FIG. 1 of the drawings, the preferred form of the cuvette includes a cylindrical housing 10 having an axial bore 12 extending therethrough adapted to receive from one end in a slip fit a generally cylindrical electrode cell carrier 20. The other end of the bore 12 is preferably threaded and has closure 14 therein which may preferably include a thermistor (not shown) to compensate for the effects of temperature change on the electrode measurements.

A pair of spaced-apart tubular chambers 16, 18 extend radially through the housing 10 and through the axial bore 12. Chamber 16 adjacent closure 14 comprises a measurement chamber through which a fluid may be moved and in which measurements are made. Chamber 18 comprises a calibration chamber for calibrating the electrode cell. Preferably, for reasons which will be explained further on, the chambers 16, 18 are at different radial positions relative to bore 12 as shown in FIG. 1.

The cuvette includes cell carrier 20 in bore 12 as shown in FIGS. 2 and 4. The carrier 20, see FIG. 6, in its preferred form, comprises at one end a shank portion 22 which protrudes from the open end of bore 12 when the other end of the carrier abuts closure 14 as in FIG. 2. Adjacent its other end the carrier 20 is provided with a radial bore 24 therethrough adapted for selective alignment with chambers 16, 18 to provide respectively through passages in said housing 10 for measurements and calibration. The inner portion of carrier 20 comprises an integral cell holding chamber 23 having an axial bore 26 extending through the shank 22 into radial bore 24 for receiving an electrode cell 50, the axial bore 26, adjacent radial bore 24, being of diameter to receive such a cell in a sealing fit. The face 36 of the carrier 20 provides a movable sealing wall for chamber 16 when the carrier is withdrawn to a calibration position as in FIG. 4.

The carrier 20 has grooves 28, 30, FIG. 6, about its circumference above and below radial bore 24 to receive O-rings 32, 34 which function, as will be more fully explained, to seal measurement chamber 16 from calibration chamber 18, as in FIGS. 2 and 4, and to seal the calibration chamber 18 from external contaminants when it is in use as in FIG. 4.

Axially extending groove 38 and intersecting circumferential groove 40 are positioned on the shank of carrier 20 for cooperation with housing set screw 42 to locate the carrier axially in bore 12 relative to the measurement and calibration chambers 16, 18 and to accurately align bore 26 with chamber 16 when measurements are being made.

The modified cuvette shown in FIG. 7 is substantially the same as that shown in FIGS. 1–5 except that the housing 10' is in two pieces 11, 17. Flow chamber portion 17 houses measurement chamber 16' and has a threaded opening to receive body portion 11 which in turn houses calibration chamber 18' (not shown) and axial bore 12'. In this embodiment closure 14 may be eliminated since adequate access to the interior may be obtained through the threaded opening. Of course, if it be desired to include a thermistor in a closure member, such may optionally be retained. In other respects the embodiment of FIG. 7 is identical to that of FIGS. 1–5.

A further modification of the cuvette is illustrated in FIGS. 8 and 9. In this embodiment the housing 10" includes a casing 13, and a chamber portion 19 threaded into one end of the casing. Carrier 20" is in two parts including a cylinder 21 rotatably mounted in the casing 13 in opening 12" adjacent chamber portion 19, and also including cylindrical cell holder 25 in bore 15. The chambers 16", 18" are formed in the chamber portion 19 and have coplanar openings 44, 46 adjacent the cylinder 21 which functions to selectively close the openings 44, 46, the chamber abutting wall providing a movable sealing wall 36", and to provide an entry through bore 15 for the holder 25 into the chambers 16″, 18″. The holder 25 is simply an axially bored cylinder adapted to receive therein polarographic cell 50″ for entry into chambers 16″, 18″. Bore 15 is positioned in cylinder 21, parallel to and spaced from the axis thereof, such that on rotation of cylinder 21, it may meet the openings 44, 46 of chambers 16″, 18″ for insertion of cell 50″ therein. Seal 37 is provided in groove 37 of the holder 25. A seal 29 in groove 33 is also provided around opening 44 of chamber 16″ to prevent fluid from passing therefrom or thereto. An additional seal 35 is provided about chamber portion 19 in groove 31 to seal the calibration chamber 18″ from external contamination without at the same time interfering with flow thereto of any material trapped between cylinder 21 and chamber portion 19.

Instead of the two piece construction in the FIG. 9 embodiment, if desired, the cell carrier 20″ could be constructed with the holder integral therewith as in FIGS. 1–7. The two piece construction is preferred, however, as it sets back the delicate cell 50″ from the walls relative to which it is moved for selective measurement and calibration.

The cell 50 contemplated for use in each of the described embodiments is the same and is illustrated in FIG. 10. It is, in a preferred embodiment, a polarographic cell comprising a stainless steel outer anode cylinder 52 of length sufficient to extend beyond the shank 22 of carrier 20, with a silver sleeve 54 positioned in press fit within cylinder 52. Axially therewithin is positioned a gold cathode wire 56. A layer 58 of epoxy resin insulation is provided between the anode and cathode. The configuration of the tip of the cell is generally parabolic. Cylinder 52 has a groove 53 adjacent the tip of the cell to receive entirely therewithin O-ring 60 which is used to retain on the tip a membrane 62 of material permeable to the substance being measured and impermeable to other substances, e.g. polypropylene or polytetrafluoroethylene in the case of $pO_2$ measurements. For ease of handling, the cell 50 is mounted on an enlarged handle 64, FIG. 2, which may be removably attached to the carrier 20. Suitable leads 65, 66 are attached to the anode and cathode, FIG. 2.

In operation, suitable electrolyte 68 is first placed on the tip of cell 50. Membrane 62 is then placed on the tip and fastened in place by slipping the O-ring 60 thereover into groove 53. The cell 50 is next placed in the bore 26 of the carrier 20 and the carrier is inserted in bore 12 of the housing 10. Groove 38 is then aligned with set screw 42 and the screw is turned to protrude into the groove, but not sufficiently to exert any binding force therein. The carrier 20 is then withdrawn to a calibration position with set screw 42 in groove 40 and is turned for alignment with calibration chamber 18. In this position it is impossible for the carrier 20 to be inadvertently moved to measurement chamber 16 which is the reason for positioning the chambers at different radial angles relative to the axis of bore 12.

The cuvette then being assembled, the cell leads 65, 66 are connected to a power source and a reading device and calibrated. The thermistor, if any, is also activated. Any liquid in the chamber is first flushed out and then a gas, such as $N_2$, containing none of the substance to be measured is introduced into the chamber for calibration at a zero reading. After calibration the entire assembly may be sterilized by gas or cold sterilization, or autoclaving where the membrane 62 will resist heat.

Following this procedure, a flowing fluid stream, such as blood, to be measured is introduced via chamber 16 into the cuvette. If a liquid such as blood is to be measured, all gases are first removed from the radial bore 24 and chamber 18 by filling with a suitable liquid and only then aligning groove 38 with set screw 42 and moving the carrier 20 to a measurement position aligned with chamber 16. A continuous polarographic measurement may then be made.

If it is necessary to recalibrate or to replace or repair the cell 50, this may be done without interrupting the fluid flow by moving the carrier 20 to the calibrating position and taking such action, including removal of the cell 50 from the carrier 20, as is necessary. Sealing wall 36 in conjunction with seal 32 prevents leakage into the calibration chamber and vice versa.

Other embodiments of this invention will occur to those skilled in the art which are within the spirit and scope of the following claims.

What is claimed is:

1. A cuvette for supporting a sensing cell for measurements in a fluid stream and for calibration in said cuvette outside and without interference with said stream comprising:
    a housing;
    a measurement chamber extending through said housing for connection to said stream;
    a calibration chamber spaced apart from said measurement chamber and extending through said housing for connection to a source of calibration fluid;
    an entrance in the wall of each of said chambers for exposing thereto a sensing cell;
    a carrier in said housing adjacent said entrances having an opening therethrough receiving and holding said sensing cell, said carrier being movably positioned in said housing for selective movement of said opening and said sensing element between said chambers; and
    a sealing wall on said carrier adjacent said measurement chamber entrance movable with said carrier across said measurement chamber entrance for closure thereof on movement of said opening and said sensing element toward said calibration chamber;
    whereby selectively, measurements may be made in a fluid stream, or, without significant interference with said stream, calibrations may be made outside said stream.

2. The cuvette claimed in claim 1 wherein said sensing cell comprises an anode, a cathode adjacent said anode, a barrier of insulating material between said anode and cathode, a face exposing both said anode and cathode, an electrolyte bridging said anode and cathode, and a membrane pervious to the substance being measured and impervious to other substances extending across said face.

3. The cuvette claimed in claim 1 in which said entrances are positioned in one plane in said housing, said carrier is rotatably positioned in said housing adjacent said entrances on an axis therebetween at right angles to said plane, said opening is positioned in said carrier a predetermined distance from said axis for selective alignment with said entrances on rotation of said carrier, and said portion of said carrier adjacent said entrances and said opening comprises said sealing wall.

4. The cuvette claimed in claim 3 in which said opening has an axis parallel to said carrier axis and has wall surfaces parallel to its axis whereby said opening is adapted for positioning said sensing cell therein movably parallel to said carrier axis for selective insertion of said sensing cell through said entrances into said chambers.

5. The cuvette claimed in claim 4 in which a portion of said carrier is exposed through said housing for manual rotative adjustment thereof and in which said opening is exposed through said exposed portion of said carrier for manual axial adjustment of said sensing cell.

6. The cuvette claimed in claim 5 wherein said sensing cell comprises an anode, a cathode adjacent said anode, a barrier of insulating material between said anode and cathode, a face exposing both said anode and cathode, an electrolyte bridging said anode and cathode, and a membrane pervious to the substance being measured and impervious to other substances extending across said face.

7. The cuvette claimed in claim 1 in which said entrances are spaced along the axis of said opening and said chambers extend transversely thereof, said carrier is movable axially on said axis between said chambers for selective alignment of said sensing cell therewith, and said sealing wall is a wall at and connected to said carrier axially spaced from said opening.

8. The cuvette claimed in claim 7 wherein said sensing cell comprises an anode, a cathode adjacent said anode, a barrier of insulating material between said anode and cathode, a face exposing both said anode and cathode, an electrolyte bridging said anode and cathode, and a membrane pervious to the substance being measured and impervious to other substances extending across said face.

9. A cuvette for sensitive electrode measurements in a fluid stream and for calibration in said cuvette outside and without interference with said stream comprising:
   a housing;
   a first tubular opening in said housing;
   a cell carrier axially movably positioned in said first opening, with a second tubular opening axially extending through said carrier receiving and holding a sensitive electrode cell therein;
   a tubular measurement chamber for connection to said stream transversely extending through said housing intersecting said first opening;
   spaced from said measurement chamber, a tubular calibration chamber for connection to a source of calibration fluid transversely extending through said housing intersecting said first opening;
   the intersection of said chambers and said first opening defining entrances in said chambers; and
   a sealing wall connected to said carrier axially spaced from said second opening and movable with said carrier across said measurement chamber for closure thereof on axial movement of said cell and carrier toward said calibration chamber;
   whereby, selectively, measurements may be made in a fluid stream, or, without significant interference with said stream, calibrations may be made outside said stream.

10. The cuvette claimed in claim 9 wherein said sensitive electrode cell comprises an anode, a cathode adjacent said anode, a barrier of insulating material between said anode and cathode, a face exposing both said anode and cathode ,an electrolyte bridging said anode and cathode, and a membrane pervious to the substance being measured and impervious to other substances extending across said face.

11. The cuvette claimed in claim 9 in which said carrier includes a shank portion at one end thereof extending beyond said housing for manual axial adjustment thereof.

12. The cuvette claimed in claim 11 in which the other end of said carrier is said sealing wall, a transverse tubular opening is positioned at the other end of said carrier between said sealing wall and said second opening adapted for selective alignment with said chambers and in which said measurement chamber is that chamber most remote from said shank portion.

13. The cuvette claimed in claim 12 in which said chambers intersect said first opening in said housing at different radial angles relative thereto, and in which said first opening and said carrier are cylindrical in shape and relatively rotatable whereby said carrier must be rotated for alignment of said transverse opening respectively with each of said chambers.

14. The cuvette claimed in claim 13 in which said carrier includes on said shank portion a circumferential groove, a longitudinal groove on the circumference thereof intersecting and extending from said circumferential groove toward said one end, and, in said housing, removable locating means positioned therein adapted for protrusion into said grooves for selective cooperation with said longitudinal groove for alignment of said transverse opening with said measurement chamber and for selective cooperation with said circumferential groove for rotative adjustment of said carrier to align said transverse opening with said calibration chamber.

15. The cuvette claimed in claim 14 in which said tubular opening in said housing extends through said housing and in which removable closure means is positioned therein at the end thereof adjacent said measurement chamber.

16. The cuvette claimed in claim 15 wherein said sensitive electrode cell comprises an anode, a cathode adjacent said anode, a barrier of insulating material between said anode and cathode, a face exposing both said anode and cathode, an electrolyte bridging said anode and cathode, and a membrane pervious to the substance being measured and impervious to other substances extending across said face.

References Cited

UNITED STATES PATENTS

| | | | |
|---|---|---|---|
| 2,886,771 | 5/1959 | Vincent | 204—195 |
| 3,151,052 | 9/1964 | Arthur et al. | 204—195 |
| 3,290,584 | 12/1966 | Harms et al. | 324—30 |

JOHN H. MACK, *Primary Examiner.*

T. TUNG, *Assistant Examiner.*

U.S. Cl. X.R.

23—253; 204—286, 297